United States Patent
Danev et al.

(10) Patent No.: US 11,072,380 B2
(45) Date of Patent: Jul. 27, 2021

(54) FRONT SPOILER ASSEMBLY FOR A MOTOR VEHICLE

(71) Applicant: APOLLO TYRES GLOBAL R&D B.V., PT Enschede (NL)

(72) Inventors: Dimitar Danev, Renningen (DE); Markus Paulitsch, Ettlingen (DE); Steffen Hoelzel, Eberdingen (DE); Klaus Pfister, Maulbronn (DE); Mike Peeters, Vlimmeren (BE); Gerlof Korte, NB Oldenzaal (NL); Bart Oude Luttikhuis, CG Oldenzaal (NL)

(73) Assignee: APOLLO TYRES GLOBAL R&D B.V., PT Enschede (NL)

(*) Notice: Subject to any disclaimer, the term of this patent is extended or adjusted under 35 U.S.C. 154(b) by 0 days.

(21) Appl. No.: 16/842,766

(22) Filed: Apr. 8, 2020

(65) Prior Publication Data
US 2020/0324833 A1   Oct. 15, 2020

(30) Foreign Application Priority Data
Apr. 9, 2019   (DE) .................... 10 2019 109 371.6

(51) Int. Cl.
*B62D 35/00* (2006.01)
*B62D 35/02* (2006.01)

(52) U.S. Cl.
CPC ........... *B62D 35/005* (2013.01); *B62D 35/02* (2013.01)

(58) Field of Classification Search
CPC ................... B62D 35/005; B62D 35/02
USPC ........................................ 296/180.3, 180.5
See application file for complete search history.

(56) References Cited

U.S. PATENT DOCUMENTS

| | | | |
|---|---|---|---|
| 6,286,893 B1 * | 9/2001 | Presley | B62D 35/005 296/180.5 |
| 8,887,845 B2 * | 11/2014 | McDonald | B62D 35/005 180/68.1 |
| 9,738,328 B2 * | 8/2017 | Fahland | B62D 37/02 |
| 9,975,419 B2 * | 5/2018 | Eckstein | B62D 35/005 |
| 2014/0175831 A1 | 6/2014 | Hoelzel et al. | |
| 2015/0166130 A1 | 6/2015 | Lee et al. | |
| 2019/0092402 A1 * | 3/2019 | Fahland | B60W 30/02 |

FOREIGN PATENT DOCUMENTS

| | | |
|---|---|---|
| DE | 10 2011 121 538 A1 | 8/2012 |
| DE | 10 2012 020 739 A1 | 4/2014 |
| DE | 10 2014 111 565 A1 | 6/2015 |
| FR | 2 994 414 A1 | 2/2014 |
| JP | 03128779 A * | 5/1991 |

* cited by examiner

*Primary Examiner* — Jason S Daniels
(74) *Attorney, Agent, or Firm* — Norman B. Thot

(57) ABSTRACT

A front spoiler assembly for a motor vehicle. The front spoiler assembly includes a spoiler lip which is arranged to extend at least partially in a transverse direction of the motor vehicle in a front area of the motor vehicle. The spoiler lip includes a front side, a spoiler lip outer edge which faces away from a front part of the motor vehicle, and at least two spoiler areas. At least one actuator device moves the at least two spoiler areas either separately or together from a retracted rest position to an extended spoiler position. The at least two spoiler areas are separated from each other at the front side of the spoiler lip by at least one depression form which extends into the spoiler lip outer edge.

8 Claims, 2 Drawing Sheets

FRONT SPOILER ASSEMBLY FOR A MOTOR VEHICLE

CROSS REFERENCE TO PRIOR APPLICATIONS

Priority is claimed to German Patent Application No. DE 10 2019 109 371.6, filed Apr. 9, 2019. The entire disclosure of said application is incorporated by reference herein.

FIELD

The present invention relates to a front spoiler assembly for a motor vehicle, the front spoiler assembly comprising a spoiler lip which extends at least partially in transverse direction of the motor vehicle in the front area of the motor vehicle, the spoiler lip having at least two spoiler areas which are transferable separately or together from a retracted rest position to an extended spoiler position by at least one actuator device.

BACKGROUND

Front spoiler assemblies have previously been described. A front spoiler assembly arranged in the front area generally reduces the amount of air flowing through below the vehicle, improves the air flow surrounding uncovered chassis frames, and thus reduces air resistance and front axle lift.

In order to even further improve the front spoiler assembly with the aid of an improved flexibility, DE 10 2011 121 538 A1 describes providing a front spoiler assembly whose spoiler lip comprises at least two spoiler areas which can be adjusted separately. A disadvantage of such a front spoiler assembly is that relatively high forces need to be applied by the actuator device in order to adjust one area of the spoiler lip relative to the other.

SUMMARY

An aspect of the present invention is to avoid the above-mentioned disadvantage in a simple and cost-effective manner.

In an embodiment, the present invention provides a front spoiler assembly for a motor vehicle. The front spoiler assembly includes a spoiler lip which is arranged to extend at least partially in a transverse direction of the motor vehicle in a front area of the motor vehicle. The spoiler lip includes a front side, a spoiler lip outer edge which faces away from a front part of the motor vehicle, and at least two spoiler areas. At least one actuator device is configured to move the at least two spoiler areas either separately or together from a retracted rest position to an extended spoiler position. The at least two spoiler areas are separated from each other at the front side of the spoiler lip by at least one depression form which extends into the spoiler lip outer edge

BRIEF DESCRIPTION OF THE DRAWINGS

The present invention is described in greater detail below on the basis of embodiments and of the drawings in which.

DETAILED DESCRIPTION

In an embodiment, the present invention provides separating the individual spoiler areas from each other at a front side of the spoiler lip by at least one depression form extending into a spoiler lip outer edge which faces away from the front part. The increased flexibility thereby obtained in the transition zone of two different spoiler areas to be actuated enables a substantial reduction in the actuation force to be applied by the actuator device. The different spoiler areas are also optically separated from each other, which is desired in terms of design. The depression form can generally take on a plurality of geometric shapes. The orientation of the angle in which the depression form extends towards the spoiler lip outer edge can, for example, also be freely selected in a certain area.

In an embodiment of the present invention, the at least one depression form can, for example, extend from the front part across the entire spoiler lip. It can thereby be provided that only a small actuation force needs to be applied to adjust a spoiler area due to the depression form extending across the entire width of the spoiler lip.

The at least one depression form can advantageously extend in the vertical longitudinal direction of the motor vehicle. If desired for design reasons, the depression form can also be arranged at a certain angle towards the vertical direction of the motor vehicle.

The at least one depression form can advantageously be configured as a bead. The bead can be configured as a trapezoidal bead, a wave bead and/or a semicircular bead.

In an embodiment of the front spoiler assembly according to the present invention, two outer spoiler areas and one central spoiler area can, for example, be provided, wherein at least the outer spoiler area can be retracted or extended together, respectively. Depending on the driving mode of the motor vehicle, a so-called CW area, in which the air resistance and thus the fuel consumption is optimized, can be realized by the extended outer spoiler area, and a so-called Performance Mode, in which the central spoiler area is extended, can be realized.

The actuator device can advantageously be provided as a pneumatic actuator. It is thereby advantageous if an actuator is provided for all spoiler areas, wherein a valve assembly is provided which allows for a various control of the spoiler areas.

The present invention is described in greater detail below under reference to the drawings.

Figure 1:
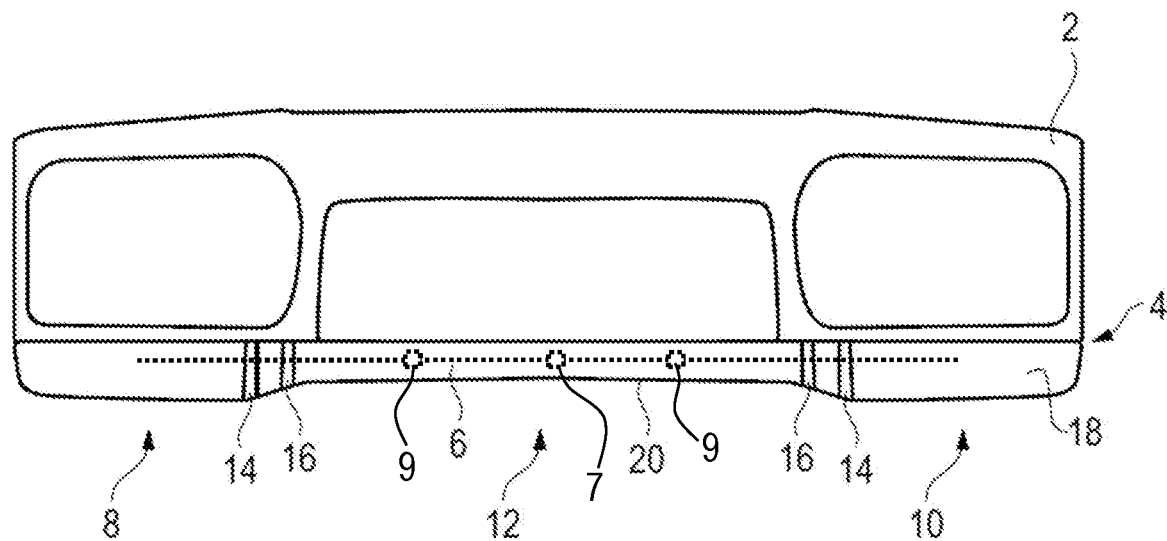
FIG. 1 shows a front view of a front area of a motor vehicle comprising a front spoiler assembly according to the present invention in a first operating state.

FIG. 1 show a front view of a front part 2 of a motor vehicle (which is not further illustrated) comprising a front spoiler assembly 4 extending in a transverse direction of the motor vehicle and thus of the front part 2, of which only the spoiler lip 6 is here illustrated. Regarding a possible embodiment of the front spoiler assembly 4 and the description of a possible actuator device, reference is here made to DE 10 2012 020 739 A1, which is incorporated by reference herein in its entirety, which describes a pneumatic actuator as an actuator device for actuating the front spoiler lip 6.

The front spoiler lip 6 illustrated here comprises three spoiler areas 8, 10 and 12. The reference signs 8, 10 refer to outer spoiler areas and the reference sign 12 refers to a central spoiler area which is arranged therebetween. In the illustrated position, the outer spoiler areas 8, 10 are in an extended state, and the central spoiler area 12 is in a retracted state. This operating situation is described as "CW area" via which the air resistance of the motor vehicle is optimized and thus the fuel consumption of the motor vehicle is reduced.

According to the present invention, depression forms 14, 16 configured as beads are provided in the front spoiler lip 6, each separating the outer areas 8, 10 from the central spoiler area 12. The depression forms 14, 16 extend at a front side 18 of the spoiler lip 6 from the front area 2 towards a spoiler lip outer edge 20. In the present exemplary embodiment, the depression forms 14, 16 thus extend across the entire width of the spoiler lip 6. In this case, the depression forms 14, 16 substantially extend in a vertical direction of the spoiler lip 6 and thus of the motor vehicle, but are angled slightly outwards (see in particular FIG. 2), which creates a dynamic shape in terms of design. One actuator device 7 (which is shown with a dashed line) is arranged behind the central spoiler area 12. The actuator device 7 is provided as a pneumatic actuator and works directly on the central spoiler area 12, and on the outer areas 8, 10 via a respective valve assembly 9.

Figure 2:
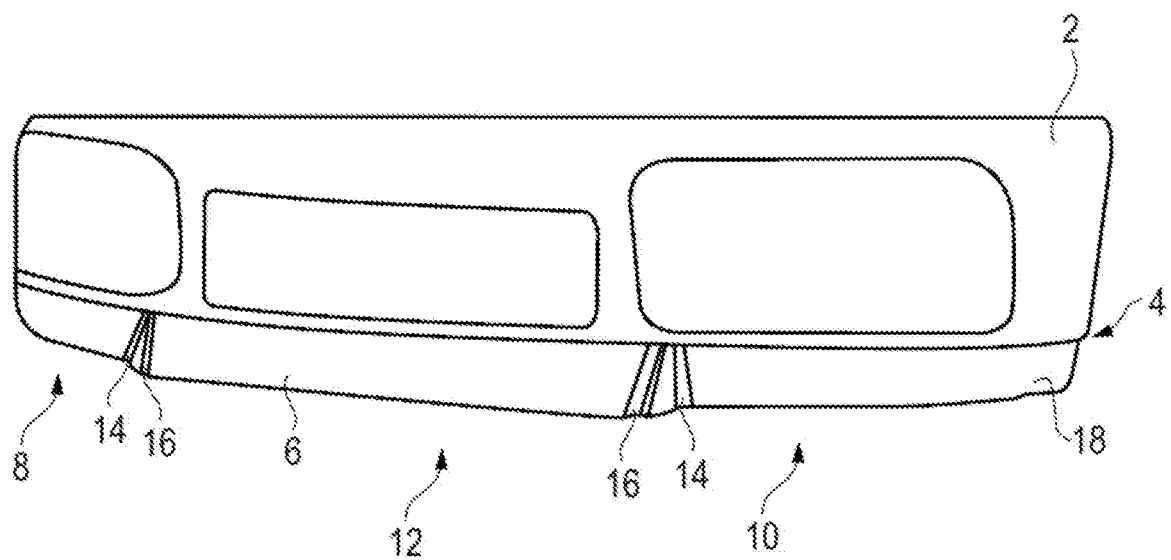
FIG. 2 shows a perspective front view of the front area of FIG. 1 comprising the front spoiler assembly according to the present invention in a second operating state.

FIG. 2 shows a perspective front view of the front spoiler assembly 4 of FIG. 1 in a second operating state, namely the "performance state". The central spoiler area 12 is thereby extended and the outer spoiler areas 8, 10 are retracted. This operating state is particularly appropriate for high speeds of the motor vehicle.

It is of course also possible to extend all three spoiler areas 8, 10, 12.

Due to the depression forms 14, 16 which separate the outer spoiler areas 8, 10 from the central spoiler area 12, upon an extension movement of a spoiler area 8, 10, 12, the actuating force for the actuator device can be substantially reduced compared to a spoiler area 8, 10, 12 remaining in the rest position.

Figure 3:
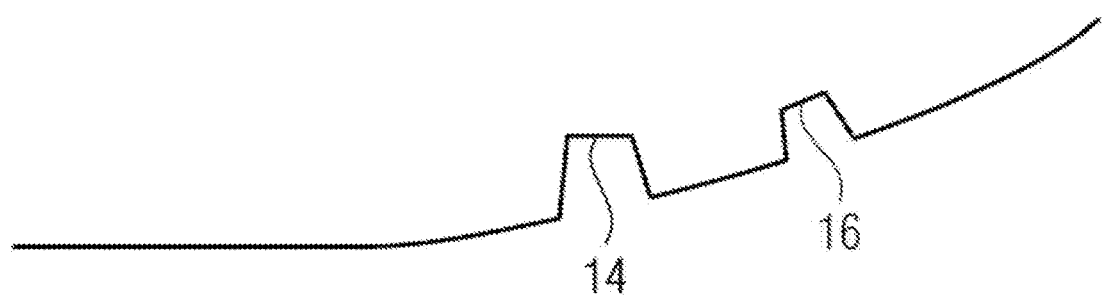
FIG. 3 shows a schematic sectional view of two trapezoidal beads as a first possible bead form.
Figure 4:
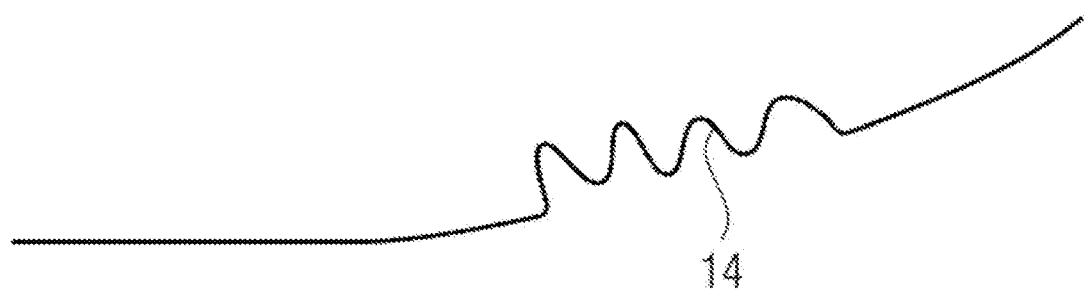
FIG. 4 shows a schematic sectional view of a wave bead as a second possible bead form.
Figure 5:
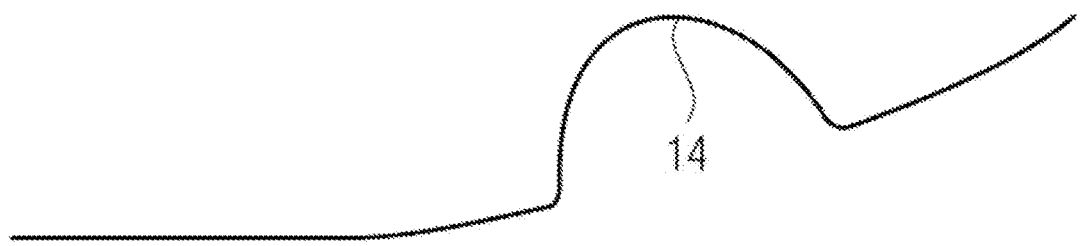
FIG. 5 shows a schematic sectional view of a semicircular bead as a third possible bead form.
Figure 6:
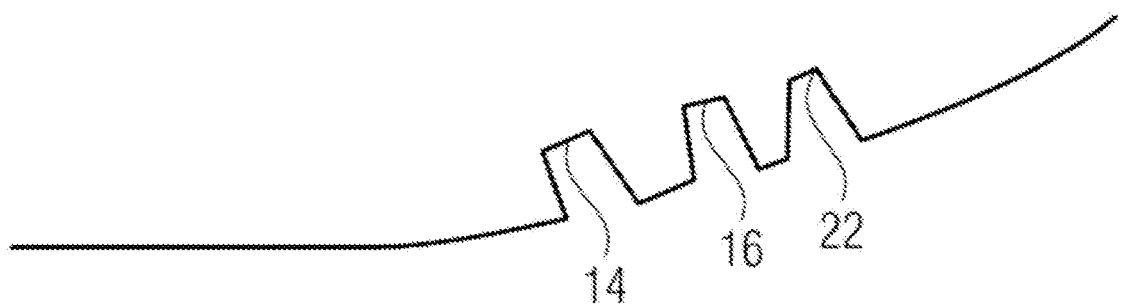
FIG. 6 shows a schematic sectional view of several trapezoidal beads as a fourth possible bead form.

FIGS. 3-6 show a schematic sectional view of different bead forms which can be applied. FIG. 3 shows two trapezoidal beads 14, 16, FIG. 4 shows a wave bead 14, 16, FIG. 5 shows a semicircular bead 14, and FIG. 6 shows several trapezoidal beads 14, 16, 22. Such different bead forms can be applied depending on the appearance desired.

The present invention is not limited to embodiments described herein; reference should be had to the appended claims.

What is claimed is:

1. A front spoiler assembly for a motor vehicle, the front spoiler assembly comprising:
    a spoiler lip which is arranged to extend at least partially in a transverse direction of the motor vehicle in a front area of the motor vehicle, the spoiler lip comprising a front side, a spoiler lip outer edge which faces away from a front part of the motor vehicle, and at least two spoiler areas; and
    at least one actuator device which is configured to move the at least two spoiler areas both separately or together from a retracted rest position to an extended spoiler position,
    wherein,
    the at least two spoiler areas are separated from each other at the front side of the spoiler lip by at least one depression form which extends into the spoiler lip outer edge.

2. The front spoiler assembly as recited in claim 1, wherein the at least one depression form extends from the front part and completely across the spoiler lip.

3. The front spoiler assembly as recited in claim 1, wherein the at least one depression form extends in a vertical longitudinal direction of the motor vehicle.

4. The front spoiler assembly as recited in claim 1, wherein the at least one depression form is configured as a bead.

5. The front spoiler assembly as recited in claim 4, wherein the bead is configured as at least one of a trapezoidal bead, a wave bead, and a semicircular bead.

6. The front spoiler assembly as recited in claim 1, wherein,
    the at least two spoiler areas comprises two outer spoiler areas and one central spoiler area, and
    at least the outer spoiler areas are configured to be at least one of jointly retracted and jointly extended.

7. The front spoiler assembly as recited in claim 1, wherein the actuator device is a pneumatic actuator.

8. The front spoiler assembly as recited in claim 7, further comprising:
    a valve assembly,
    wherein,
    one actuator device is provided for each of the at least two spoiler areas, and
    the valve assembly is configured to provide for a various control of the at least two spoiler areas.

* * * * *